United States Patent [19]
Dadian

[11] 4,182,435
[45] Jan. 8, 1980

[54] CAM ACTUATED DISK BRAKE MECHANISM

[75] Inventor: Thomas F. Dadian, Santa Paula, Calif.

[73] Assignee: Bunker Ramo Corporation, Oak Brook, Ill.

[21] Appl. No.: 883,364

[22] Filed: Mar. 6, 1978

[51] Int. Cl.² ............................................. F16D 65/14
[52] U.S. Cl. ..................................... 188/72.7; 74/110; 74/567; 188/73.1; 188/73.4; 188/83; 192/70.23; 192/93 R
[58] Field of Search .................... 188/72.7, 73.1, 73.4, 188/83, 250 B; 74/110, 567; 192/70.23, 93 R

[56] References Cited

U.S. PATENT DOCUMENTS

| | | | |
|---|---|---|---|
| 638,990 | 12/1899 | Replogle | 74/110 |
| 2,970,445 | 2/1961 | Suderow | 74/110 X |
| 3,221,841 | 12/1965 | Kraklau, Jr. | 188/72.7 |
| 3,237,724 | 3/1966 | Kershner et al. | 188/72.7 X |
| 3,335,820 | 8/1967 | Barnett | 188/73.4 X |
| 3,708,041 | 1/1973 | Hahn | 188/73.4 X |

FOREIGN PATENT DOCUMENTS 2314582  10/1973  Fed. Rep. of Germany ......... 188/72.7

*Primary Examiner*—George E. A. Halvosa
*Attorney, Agent, or Firm*—F. M. Arbuckle; A. Freilich

[57] ABSTRACT

A simple and compact disk brake mechanism which includes a housing having a pair of slightly separated flat guide walls, a plate-like brake member in the housing which is slideable against the disk brake, and a plate-like camming member slideable in the housing and moveable transverse to the braking member to advance the braking member against the disk brake. The housing also includes a spacer plate with a portion that reaches around the disk brake and against an area of the disk brake opposite the plate-like braking member.

5 Claims, 3 Drawing Figures

4,182,435

CAM ACTUATED DISK BRAKE MECHANISM

BACKGROUND OF THE INVENTION

Rotatable shafts are commonly braked or held against rotation by a disk brake which includes a disk and an mechanism for applying a brake member against the disk. A variety of brake mechanisms have been utilized, such as wedges or balls that act as cams to advance a braking member against the brake disk. However, these prior art devices utilized relatively complex parts such as shafts slideable in cylindrical slider bearings to operate calibers for engaging opposite sides of a brake disk. The design of such brakes not only entails the production of a variety of different types of parts, but also results in a relatively bulky brake mechanism. A brake mechanism of relatively simple design which utilized a minimum number of moving parts, with the moving and stationary parts of a simple design that facilitated production and with the mechanism being compact, would have considerable utility.

SUMMARY OF THE INVENTION

In accordance with one embodiment of the present invention, a disk brake mechanism is provided which is of simple and compact construction. The mechanism includes a housing with slightly spaced flat guide walls, a plate-like brake member between the flat walls for moving against the disk brake, and a plate-like camming member disposed between the flat walls and moveable largely transverse to the brake member to advance it.

In one disk brake mechanism, a portion of the housing which is fixed to the flat guiding walls extends over the disk brake to a location opposite the brake member to back up the disk portion pressed up by the brake member. When the camming member is withdrawn, the brake member can move down under the weight of gravity.

The novel features of the invention are set forth with particularity in the appended claims. The invention will best be understood when read in conjunction with the accompanying drawings.

DESCRIPTION OF THE PREFERRED EMBODIMENT

Figure 1:
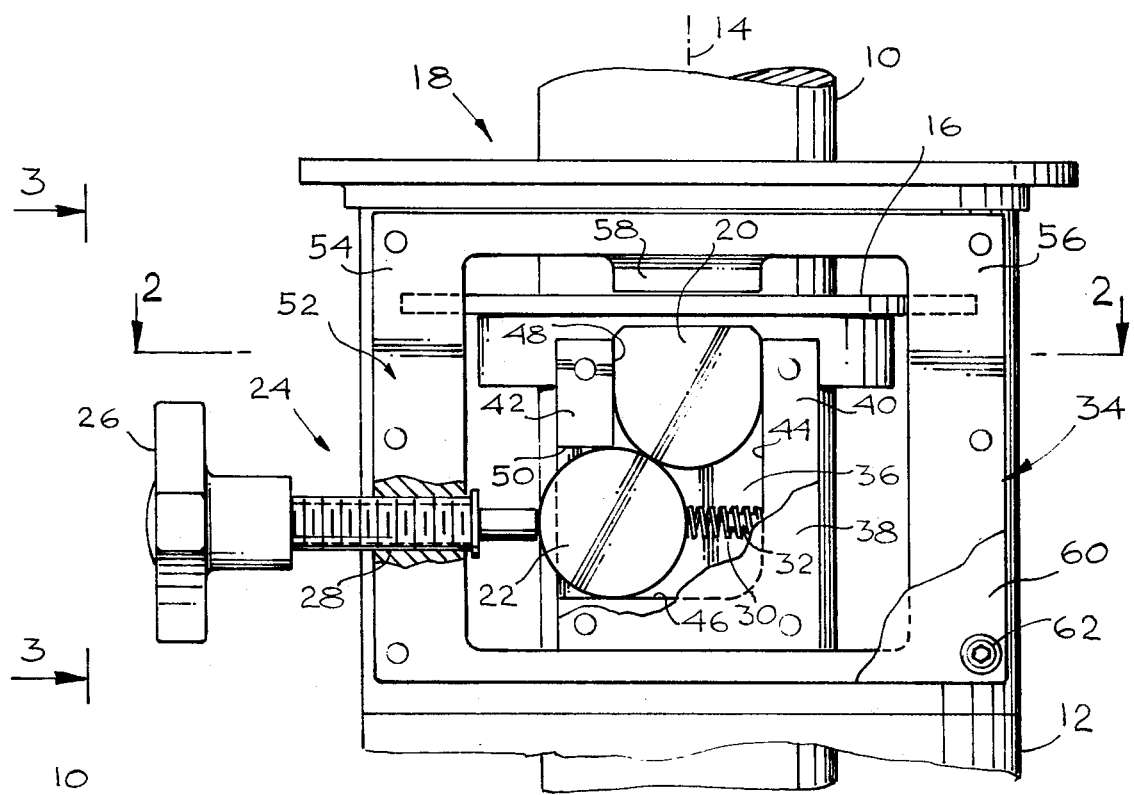
FIG. 1 is a partially sectional front view of a brake mechanism constructed in accordance with the present invention.
Figure 3:
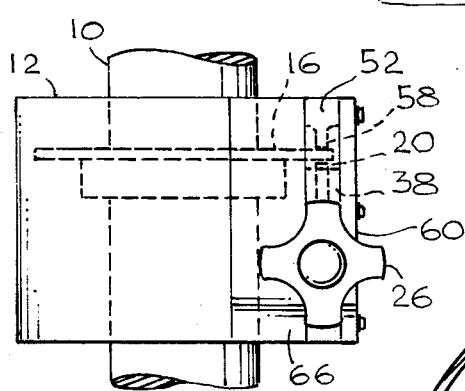
FIG. 3 is a view taken on the line 3—3 of FIG. 1.

FIG. 1 illustrates a rotatable shaft 10 which rotates within a shaft housing 12, and which extends along a vertical axis 14. In one application, the shaft 10 is designed to hold a microwave antenna (not shown) and can be slowly turned to point the antenna in any desired direction. After the shaft 10 and the antenna thereon have been pointed in the desired direction, the shaft 10 must be locked in orientation within a very small angle such as 0.1° in one application. To this end, a disk brake 16 is provided which is attached to the shaft, so that when the disk brake is restrained it prevents even slight rotation of the shaft. In one application, a brake mechanism was required which was compact and easily operated, and which was self-aligning so as to avoid the need for critical adjustments.

The mechanism 18 for engaging the brake disk 16 includes a brake member 20 which can slide up against the lower surface of the disk 16, a camming member 22 designed to move transverse to the brake member to cam the brake member upwardly, and a screw mechanism 24 for advancing the camming member. When a person turns a handle 26 of the screw member, he turns a screw 28 which has an end that presses against the camming member 22 to advance the camming member against the force of a spring 30 that is held in place by a spring retaining rod 32. The camming member has a rounded camming surface which engages a corresponding rounded surface on the brake member 20 to press up the brake member against the disk 16.

In order to facilitate the production and slideable mounting of the brake and camming members 20, 22, these members are formed in a plate-like shape. The camming member 22 can be formed by cutting off a relatively thin section of a metal rod and machining the faces of the section. Since forces applied to the camming member 22 are applied against its outer surface and since standard metal rods are available with smoothly rolled peripheries, no finishing is required at the periphery of the camming member 22. Accordingly, the camming member 22 can be accurately produced at low cost, even at low volumes. The brake member 20 can be produced by cutting it from a plate of metal, so that the periphery of the member 20 must be machined, but not necessarily its faces. It is possible to machine the brake member 20 from a section of a larger diameter rod.

The brake and camming members are mounted on a housing 34 which includes a pair of flat side plates 36, 38 that are mounted in slightly spaced parallel planes with the members 20, 22 sandwiched between them. The parallel plates are separated by shim members 40, 42 which form an inside corner having a pair of inside edges 44, 46 angled about 90° from each other for guiding the brake and camming members, the middle of the corner being rounded to facilitate machining. The shim members also form an outside corner having a pair of outside edges 48, 50 angled about 90° (or 270°) from each other. The edges 44, 48 of the shim members closely guide the brake member 20, while the edges 46, 50 guide the camming member 22. The edge 46 also serves to back up the camming member to support it as it presses against the brake member. Thus, the flat facing surfaces of the side plates 36, 38 and the edges 44–50 of the separators form two substantially perpendicular narrow passages for the brake and camming members.

Figure 2:
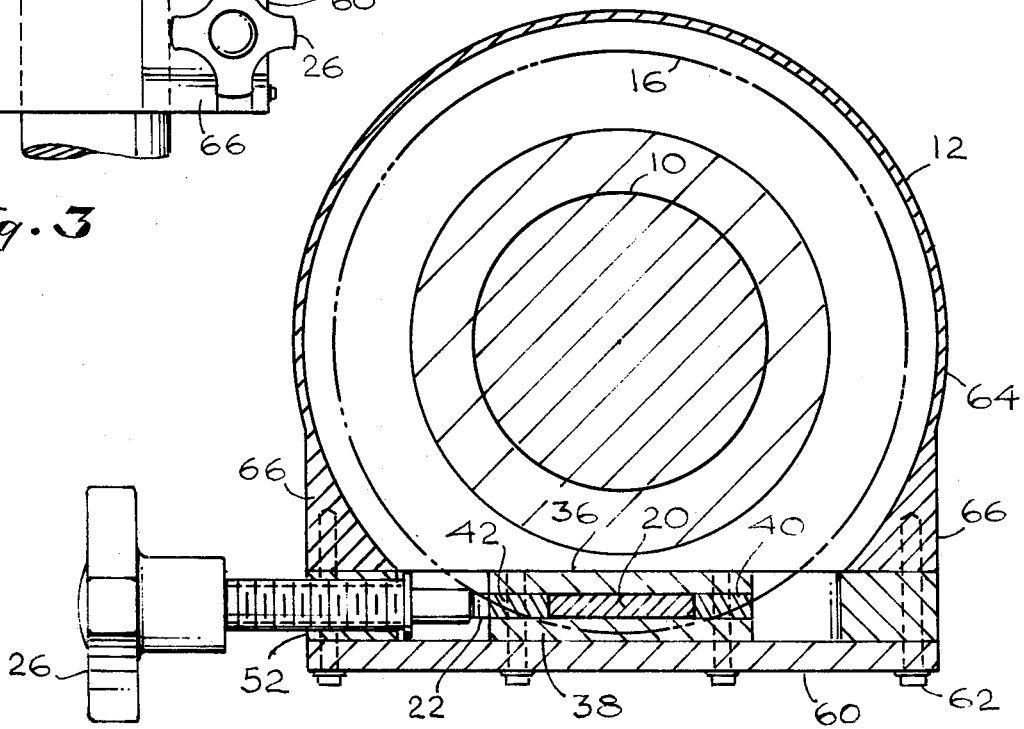
FIG. 2 is a view taken on the line 2—2 of FIG. 1.

The side plates 36, 38 and the shims and members between them, are surrounded by an outer plate-like spacer 52 which threadably supports the screw member 24 but can advance the camming member to operate the brake. The spacer 52 includes a pair of arm portions 54, 56 that extend around the brake disk 16, and that hold a backing projection 58 that lies adjacent to the upper surface of the brake disk 16 at a location opposite the brake member 20. Thus, when the brake member 20 is pressed up against the brake disk 16, it presses the brake disk against the backing projection 58 to assure secure engagement of the mechanism with the brake disk. The spacer 52, as well as the outer side plate 38, are covered by a cover plate 60 which is held in place by a group of fastening bolts 62. The portion of the shaft housing where the brake mechanism is located, includ - a shaft housing portion 64 (FIG. 2) with welded-on flanges 66 to which some of the bolts 62 are attached.

In one system which has been designed utilizing the brake mechanism described herein, the mechanism was utilized with a shaft 10 of a diameter of about 3-¾ inches, and with the camming member 22 formed on bar stock of about one inch diameter. The use of primarily flat sliding and guiding members in the construction of the mechanism, especially where small parts are utilized, or where there is low volume production, enables compact design and low cost construction of the mechanism.

Thus, the invention provides a disk brake mechanism for engaging and holding a brake disk, wherein the mechanism can be constructed of easily manufactured and low cost parts even in relatively low production, and wherein the mechanism is compact. This is accomplished by utilizing relatively flat memers that can be constructed from plates of material or from flat sections of bar stock. The brake member which moves against the brake disk and the camming member that moves transverse to the brake member, or in other words at a large angle of more than 45° and perhaps 90°, are plate-like members and are held between plates of the housing and are guided by plate-like shims. A back-up member or projection lying opposite the brake member can be formed as a portion of the housing which has a pair of arms extending around the brake disk to hold a projection that lies opposite the brake member.

Although the illustrated embodiment utilizes a manually-driven screw 28 to move the camming member 22, it should be recognized that the screw could be readily motor driven and remotely controlled.

Moreover, although particular embodiments of the invention have been described and illustrated herein, it is recognized that modifications and variations may readily occur to those skilled in the art, and consequently it is intended that the claims be interpreted to cover such modifications and equivalents.

What is claimed is:

1. A brake mechanism for holding a brake disk against rotation comprising:
   a housing;
   a brake member mounted on said housing to move against and away from the brake disk;
   a camming member mounted on said housing to move transverse to the direction of movement of said brake member; and
   means for advancing said camming member against said brake member to move said brake member into engagement with said brake disk;
   both of said members formed of metal plates of substantially the same thickness and having edges;
   said housing comprising a pair of housing parts having flat surfaces spaced apart slightly more than the thickness of said metal plates that form said members of closely guide said members, and said members being slidably disposed between said housing parts and free of pivotal connection to said housing and in direct edge contact with each other.

2. The disk brake mechanism described in claim 1 wherein:
   said housing includes a plate-like spacer with faces parallel to the faces of said brake and camming members, said spacer having a first portion lying on either side of said brake and camming members and a second portion which includes a pair of arms extending around the disk and a projection extending towards said brake member in substantially the same plane thereof and slightly spaced from the brake disk, to back up a brake disk location opposite the brake member.

3. The disk brake mechanism described in claim 1 wherein:
   said housing includes a fixed camming surface lying in the plane of said members, on a side of the path of said camming member opposite said brake member, to support said camming member as it moves said brake member.

4. The disk brake mechanism described in claim 1 wherein:
   said housing includes a plate-like shim member lying in the plane of said members and having largely perpendicular guide edges engaged respectively with said camming member and said brake member to guide them.

5. A disk brake mechanism for braking a rotatable brake disk comprising:
   a housing having a pair of housing parts with flat surfaces facing each other;
   said housing including a first plate-like shim portion between said pair of housing parts forming an outside corner with a pair of outside edges angled about 90° from each other;
   said housing including a second plate-like shim portion between said pair of housing parts forming an outside corner with a pair of outside edges angled about 90° from each other and spaced from said inside edges to leave two substantially perpendicular passages between them, with a first of said passages extending substantially perpendicular to the plane of said brake disk;
   a brake member substantially in the form of a plate closely slideably received between the edges froming said first passage that extends perpendicular to said disk and between said flat surfaces of said housing parts;
   a camming member directly in engagement with said brake member and substantially in the form of a plate of the same thickness as said brake member closely slideably received between the edges of the second of said passages and between said flat surfaces of said housing parts;
   means for advancing said camming member towards said brake member;
   said members being free of pivotal connection to said housing; and a plate-like spacer with faces parallel to the faces of said brake and camming members, said spacer having a first, portion lying on either side of said brake and camming members and a second portion which includes a pair of arms extending around the disk and a projection extending towards said brake member in substantially the same plane thereof and slightly spaced from the brake disk, to back up a brake disk location opposite the brake member.

* * * * *